Sept. 9, 1969   E. W. MOLIS   3,465,583
MACH AND AIR SPEED INDICATOR
Filed Nov. 30, 1967   3 Sheets-Sheet 1
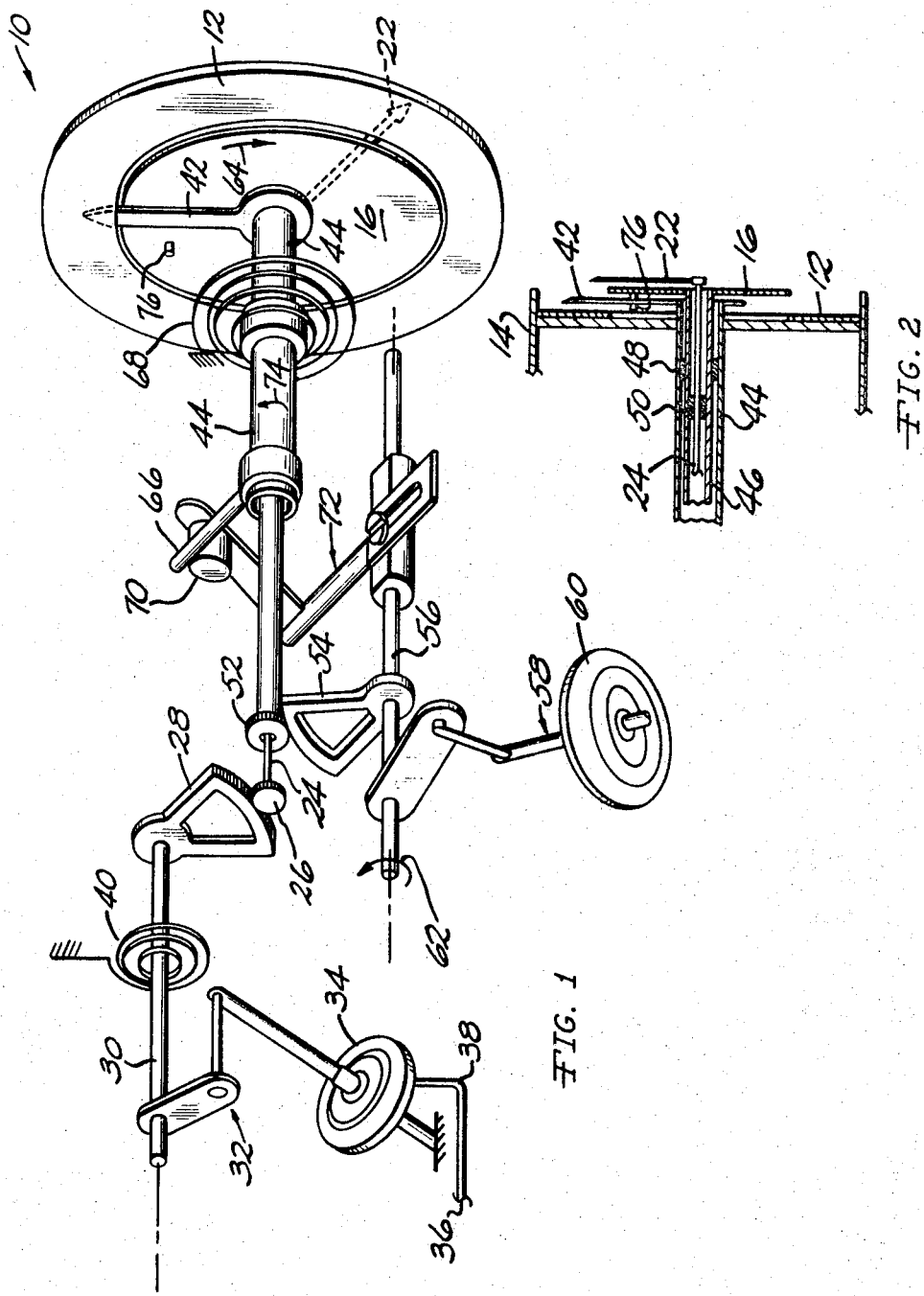
INVENTOR
EDWARD W. MOLIS
BY
*James L. O'Brien*
ATTORNEY

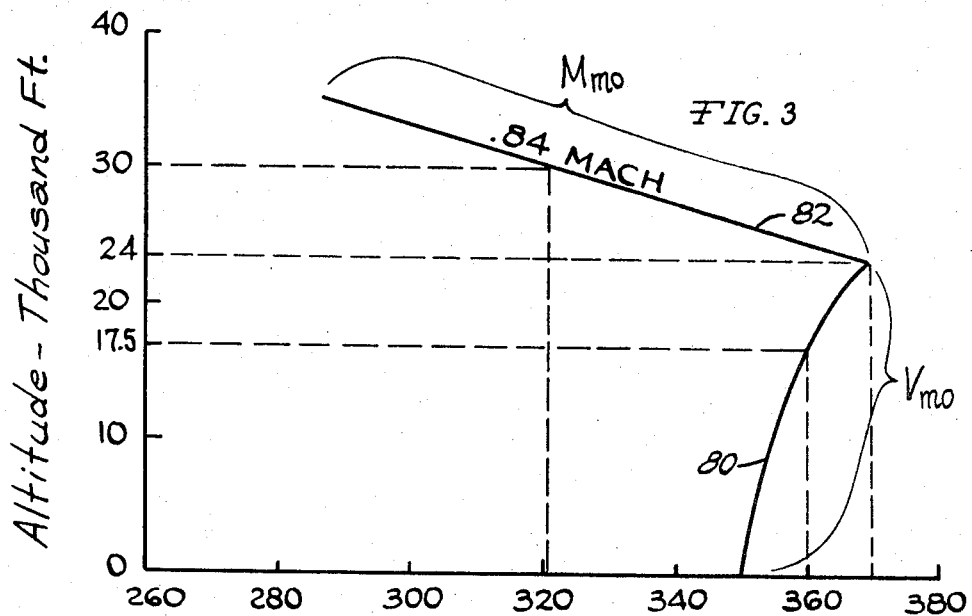
FIG. 3
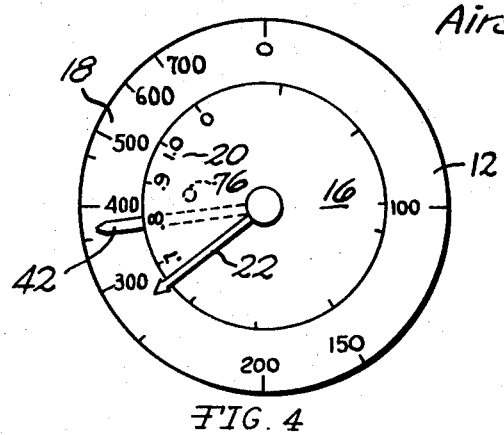
FIG. 4
FIG. 5
FIG. 6
INVENTOR
EDWARD W. MOLIS
BY *James L. O'Brien*
ATTORNEY Sept. 9, 1969  E. W. MOLIS  3,465,583
MACH AND AIR SPEED INDICATOR
Filed Nov. 30, 1967  3 Sheets-Sheet 3
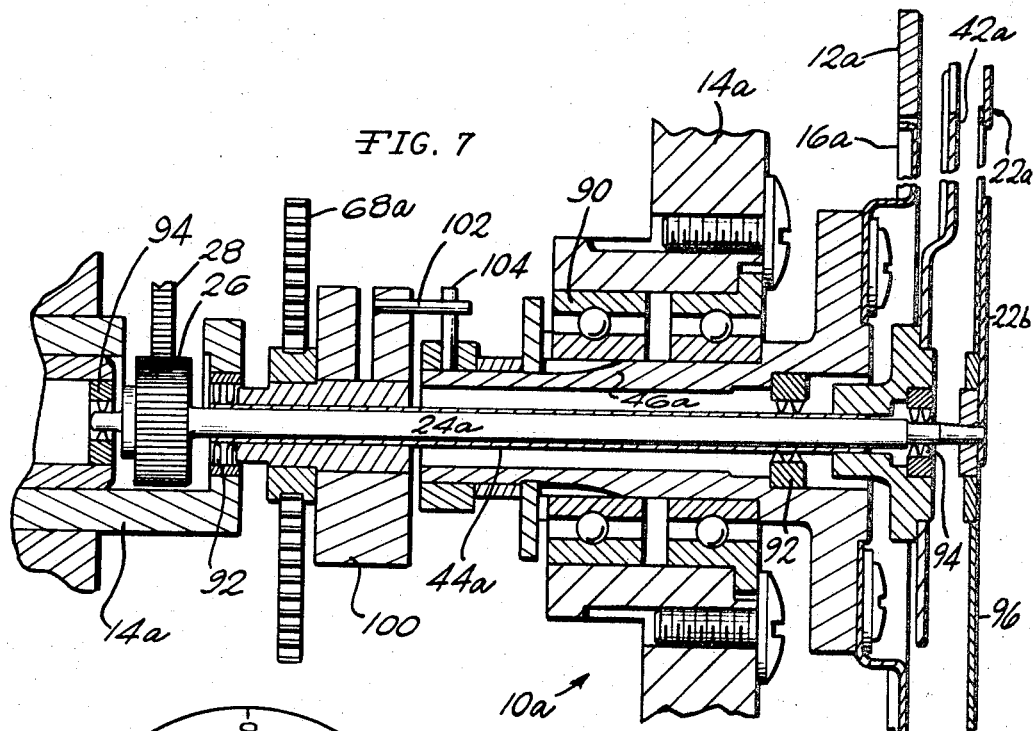
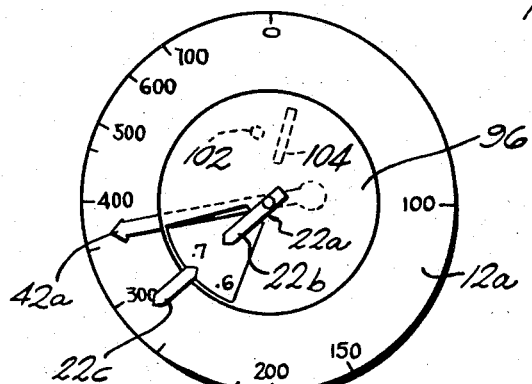
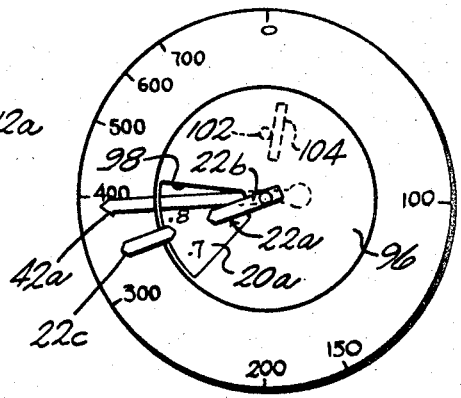
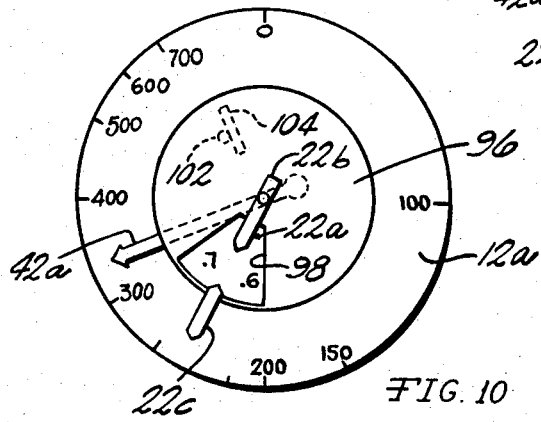
INVENTOR
EDWARD W. MOLIS
BY
*James L. O'Brien*
ATTORNEY

United States Patent Office 3,465,583
Patented Sept. 9, 1969

3,465,583
MACH AND AIR SPEED INDICATOR
Edward W. Molis, Davenport, Iowa, assignor to The Bendix Corporation, a corporation of Delaware
Filed Nov. 30, 1967, Ser. No. 686,918
Int. Cl. G01p *5/16;* G09f *9/00*
U.S. Cl. 73—182                  10 Claims

ABSTRACT OF THE DISCLOSURE

An air speed indicator is provided with a fixed dial having air speed designations, a concentric movable dial having Mach number designations, and an indicated air speed pointer movable relative to the fixed and movable dials for indicating at all altitudes the aircraft speed in terms of both knots and Mach number. A second pointer, hereinafter termed the maximum allowable air speed pointer, moves relative to the dials to indicate speed in terms of knots and at higher altitudes in Mach number terms. At a preselected altitude determined by the performance characteristics of the aircraft, the movable Mach dial and the maximum allowable air speed pointer move as a unit to provide for the same continuous maximum allowable Mach indication at altitudes higher than the preselected altitude.

BACKGROUND OF THE INVENTION

This invention relates to an air speed indicator for use in high speed aircraft. In high speed aircraft it is essential for the safety of both the pilot and the aircraft that the maximum allowable air speed consistent with the aircraft design not be exceeded. Such aircraft have a safe maximum allowable air speed characteristic that varies with altitude. In other words, the maximum allowable speed increases with altitude increase up to a certain higher altitude. At altitudes above this certain altitude, the maximum allowable speed of the aircraft is governed by a Mach number.

For the above reasons it has become common to combine a Mach indicator with an air speed indicator, as shown in U.S. Patent No. 2,706,407, assigned to the assignee of this application. It is also known to provide indications on the air speed instrument of the maximum allowable air speed up to a certain altitude and the maximum allowable Mach number speed at the higher altitudes, as illustrated in U.S. Patent No. 3,205,708. However, the instrument shown in the latter patent only provides maximum air speed indications in increments. In other words, between certain altitudes a maximum allowable air speed is indicated, while in fact the maximum allowable speed for the aircraft increases in that altitude range. In addition, the instrument shown in U.S. Patent No. 3,205,708 presents some manufacturing and reading difficulties by virtue of the necessary inclusion therein of color-coded segments which sequentially move into view behind offset viewing openings.

SUMMARY OF THE INVENTION

The instrument of this invention provides for a continuous indication of the maximum allowable aircraft velocity, hereinafter sometimes referred to as the "VMO," at lower altitudes and the maximum allowable Mach number, hereinafter sometimes referred to as the "MMO," for the particular aircraft which is being flown at various altitudes. Furthermore, this indication is provided by means of a movable pointer and an associated dial which the aircraft operators are accustomed to observing. In the air speed indicator of this invention, this is accomplished by providing a fixed dial having air speed designations, a concentric movable dial having Mach number designations, a pressure activated capsule and a rocking shaft which is rotated in response to movement of the capsule due to altitude changes. The rocking shaft is connected to a Mach dial actuating shaft which is moved in a direction to increase the Mach number reading, relative to a fixed air speed pointer position, as the aircraft altitude is increased.

A maximum allowable air speed pointer is provided with a shaft which is also moved in a predetermined path by the rocking shaft. At lower altitudes, this pointer moves in a direction to indicate higher allowable air speeds as the altitude of the aircraft is increased. At the same time, the Mach dial is being rotated in the opposite direction. At a preset altitude, which is determined by the design characteristics of the aircraft, the Mach dial drives the maximum allowable air speed pointer so that at higher altitudes, as the Mach dial is rotated, the maximum allowable air speed pointer is moved with the dial to provide a continuous MMO indication. At these higher altitudes, the Mach number designation determines the allowable aircraft speed. Thus, VMO and MMO indications are provided at all altitudes in accordance with the limiting speed curve of the aircraft for which the instrument of this invention is intended.

It is an object of this invention, therefore, to provide an improved air speed indicator.

Further objects, features and advantages of this invention will become apparent from a consideration of the following description, the appended claims, and the accompanying drawing in which:

FIGURE 1 is a somewhat schematic exploded perspective view of one form of the air speed and Mach indicator of this invention;

FIGURE 2 is a somewhat diagrammatic transverse sectional view of a portion of the form of the indicator of this invention shown in FIG. 1, illustrating the relative positions of the dials and the pointers in the indicator;

FIGURE 3 is a graphic representation of a typical limiting speed curve for an aircraft having a maximum speed characteristic that varies with altitude;

FIGURES 4–6, inclusive, are front views of the air speed indicator shown in FIG. 1 illustrating the appearance of the indicator to the aircraft operator at the various altitudes indicated on the speed curve of FIG. 3;

FIGURE 7 is a fragmentary longitudinal sectional view illustrating another form of the indicator of this invention; and FIGURES 8–10, inclusive, are front views of the form of the indicator shown in FIG. 7 illustrating the appearance of the indicator to the aircraft operator at speed and altitude conditions corresponding to those indicated in FIGS. 4–6, respectively.

With reference to the drawing, the indicator of this invention, indicated generally at 10, is illustrated in FIGS. 1 and 2 as including a fixed dial 12 mounted on a suitable frame 14, only a portion of which is shown in FIG. 2, and a concentric movable dial 16. As shown in FIGS. 4–6, inclusive, the fixed dial 12 is provided with air speed designations 18 and the movable dial 16 is provided with Mach number designations 20. An indicated air speed pointer member 22 is mounted for rotational movement relative to the dials 12 and 16 for indicating the speed at which the aircraft is traveling at all times.

The indicated air speed pointer 22 is secured to one end of a shaft 24 (FIG. 2), the opposite end of which is provided with a pinion 26 (FIG. 1). A gear sector 28 which meshes with the pinion 26 is attached to a shaft 30. A suitable linkage 32 connects the shaft 30 to a pressure activated capsule 34, the interior of which is connected to a pitot pressure source 36 by a line 38, while the exterior of the capsule 34 is subjected to ambient pressure. The usual calibrating mechanism (not shown) is associated with the capsule 34 for speed calibration purposes to produce a relatively large rotational movement of the pointer 22 at the lower air speeds to permit readability in one knot increments in the takeoff and landing range. A conventional restoring spring or hairspring 40 is connected to the shaft 30 for removing backlash and looseness in the mechanism and for biasing the shaft to a zero altitude position. The difference between pitot pressure and ambient pressure provides for movement of the capsule 34 so as to rotate the shaft 30 thereby moving the gear sector 28 so as to move the pinion 26 to rotate the indicated air speed pointer 22 relative to the fixed air speed indicating dial 12 and the movable Mach dial 16.

A maximum allowable air speed pointer 42, which pivots about an axis coincident with the axis of the shaft 24, is secured to a tubular shaft 44 rotatably mounted on the frame 14. The movable dial 16, which has the Mach number designations 20 thereon is secured to a tubular shaft 46 which can be suitably supported on bearings 48 carried by the shaft 44 and carries bearing supports 50 for the shaft 24. The Mach dial actuating shaft 46 carries a pinion 52 which meshes with a gear sector 54 mounted on a rocking shaft 56 carried on suitable supports (not shown) in the frame 14. The rocking shaft 56 is connected by a suitable linkage 58 to an evacuated capsule 60. The capsule 60 expands or contracts due to the changes in ambient air pressures and moves the linkage 58 so as to rotate the rocking shaft 56 accordingly. As the altitude of the aircraft is increased, the rocking shaft 56 is rotated in the direction of the arrow 62 in FIG. 1 so as to produce a rotation of the Mach dial 16 in the direction of the arrow 64 so that Mach number indication increases, relative to a point on fixed dial 12, as altitude increases.

A follower 66 secured to the maximum allowable air speed pointer shaft 44 is urged by a spiral spring 68 secured to the shaft 44 in a direction to maintain the follower 66 in engagement with a cam 70. The cam 70 is connected by an adjustable mounting linkage 72 to the rock shaft 56. As a result, when the rocking shaft 56 is rotated in the direction of the arrow 62, the spring 68 cooperates with the follower 66 and the cam 70 to provide for movement of the shaft 44 in the direction of the arrow 74 to in turn provide for movement of the maximum allowable air speed pointer 42 in a clockwise direction as viewed in FIGS. 4–6, inclusive. Thus, as the altitude of the indicator 10 is progressively increased from sea level, the maximum allowable air speed pointer 42 and the movable Mach number indicator dial 16 are rotated in opposite directions.

As shown in FIG. 2, the dial 16 and the pointer 42 rotate in adjacent planes. A pin 76 secured to the Mach dial 16 projects into the plane of movement of the pointer 42 so that at a preselected altitude, the pin 76 engages the pointer 42. As the altitude of the indicator 10 is increased from this preselected altitude, the pin 76 provides for movement of the pointer 42 with the dial 16 to provide for a continuous indication of a preselected Mach number on the dial 16. Thus at these higher altitudes, the pointer 42 is moved against the pressure of the spiral spring 68 which normally applies a small moment to the shaft 44 just sufficient to maintain the cam follower 66 in engagement with the cam 70.

Referring to the typical limiting speed curve illustrated in FIG. 3, it can be seen that the curve has a first portion 80 located below the critical or preselected altitude for the particular aircraft involved, which in this case is 24,000 feet, and a portion 82 above the critical altitude. At altitudes below 24,000 feet, the curve portion 80 indicates that the maximum allowable air speed increases as altitude increases. Above 24,000 feet, the maximum allowable air speed is 0.84 Mach. Thus, in the illustrated embodiment of the indicator 10, the pin 76 is located on the dial 16 at a position such that it will engage the maximum allowable air speed pointer 42 at an altitude of 24,000 feet, with the pointer 42 indicating 0.84 on the Mach dial.

The operation of the air speed indicator 10 is as follows:

When the aircraft having the limiting speed curve characteristics illustrated in FIG. 3 is flying at an altitude from 0 to 24,000 feet, the face of the indicator will appear as shown in FIG. 4, which illustrates a situation at 17,500 feet. At this altitude, the maximum allowable air speed pointer 42 is at a position indicating that the maximum allowable air speed, namely, VMO, is 360 knots and the pin 76 is spaced from the pointer 42. The indicated air speed of about 320 knots. The indicated air speed pointer knots.

In FIG. 5, the position of the maximum allowable air speed pointer 42 relative to the dials 12 and 16 is shown at an altitude of 24,000 feet, which is the critical altitude in the illustrated embodiment of the invention. At this altitude the pin 76 is in engagement with the maximum allowable air speed pointer 42 and the maximum allowable air speed pointer 42 indicates a maximum allowable air speed of about 370 knots and a Mach number of 0.84.

In FIG. 6, the position of the maximum allowable air speed pointer 42 relative to the dials 12 and 16 is shown at an altitude of 30,000 feet, and as shown the pointer 42 has been driven in a counterclockwise direction by the pin 76 to a position in which it still indicates a maximum allowable Mach number of 0.84 and a corresponding air speed of about 320 knots. The indicated air speed pointer 22 shows a speed of between 200 and 300 knots. When the maximum allowable air speed pointer is driven by the pin 76, the shaft 44 winds up the spring 68.

The form of the indicator of this invention shown in FIGS. 7–10 is generally similar to the indicator 10 heretofore described and differs therefrom principally in the structural arrangement and relationship of the maximum allowable air speed pointer, the Mach dial and the indicated air speed pointer. Consequently, only this structure will be described in detail in the indicator 10a. As shown in FIG. 7, the indicator 10a includes a frame 14a on which an annular air speed dial 12a is conventionally mounted so that the dial 12a is fixed with respect to the frame. A Mach dial 16a is concentrically arranged within the air speed dial 12a and is secured to one end of a tubular shaft 46a which is supported on bearings 90 carried by the frame 14a.

A maximum allowable air speed pointer 42a is mounted adjacent the dials 12a and 16a on one end of a tubular shaft 44a supported on bearings 92. An indicated air speed pointer 22a is mounted on one end of a shaft 24a disposed coaxially within the shaft 44a and supported on jewel bearings 94. As shown in FIGS. 8, 9 and 10, the indicated air speed pointer 22a consists of two aligned sections 22b and 22c secured to the face of a circular mask 96 of a size corresponding substantially to the size of the Mach dial 16a. The mask 96 has an irregularly shaped cutout opening 98 enabling viewing of the Mach dial designations 20a adjacent the spaced ends of the pointer sections 22b and 22c.

As shown in FIG. 7, the shaft 44a for the maximum allowable air speed pointer 42 carries a block 100 to which a pin 102 is secured. The pin 102 extends parallel to the shaft 44a and projects into the path of a radially extending pin 104 secured to the shaft 46a for the Mach dial 16a. A spring 68a, secured to shaft 44a, functions like the spring 68 previously described.

In the indicator 10a, the pin 104 functions like the pin 76 in the actuator 10 to drive the maximum allowable air speed pointer 22a at altitudes above the critical altitude for the aircraft. In the actuator 10a this drive is accomplished through the pin 102 and the shaft 44a, rather than driving the maximum allowable air speed pointer directly as in the indicator 10, to enable location of the drive pins 102 and 104 closer to the axis of shaft 44a. This location avoids inertia problems which exist when the drive pin is located further from the axis of rotation and for this reason the indicator 10a is preferred.

The operation of the indicator 10a is similar to the operation of the indicator 10 is as follows:

When the aircraft having the limiting speed characteristics illustrated in FIG. 3 is flying at an altitude below 24,000 feet, such as an altitude of 17,500 feet, the face of the indicator will appear as shown in FIG. 8. The maximum allowable air speed pointer 42, 42a indicates that the maximum allowable air speed is 360 knots and the pins 102 and 104 are spaced. The relative positions of the pins 102 and 104 is shown FIGS. 8–10 for the various altitude conditions illustrated, it being understood that these may not be the actual posiions, for purposes of clariy.

An evacuated capsule and associated linkage and rocking shaft, like the capsule 60, the linkage 58 and the rocking shaft 56, provide for predetermined rotation of the Mach dial 16a in a counterclockwise direction, as viewed in FIG. 8, in response to altitude increase. A cam and follower, like the cam 70 and follower 66, or an equivalent motion transmitting linkage extending between the rocking shaft and the shaft 44a, provides for rotation of the maximum air speed pointer 42a in a clockwise direction, as viewed in FIG. 8, in response to altitude increase below the critical altitude. Thus, at altitudes below the critical altitude, the pins 102 and 104 rotate in opposite directions, in response to altitude increase.

FIG. 9 illustrates the appearance of the indicator at the critical altitude, which is 24,000 feet in this case. The pins 102 and 104 are relatively positioned so that they engage at this altitude, as shown in FIG. 9. The maximum allowable air speed pointer 42a indicates a maximum allowable air speed of about 370 knots and a Mach number of 0.84.

In FIG. 10, the position of the maximum allowable air speed pointer 42a relative to the dials 12a and 16a is shown at an altitude above the critical altitude, namely, an altitude of 30,000 feet. The pin 104, which moves with the Mach dial 16a and thus moves counterclockwise in response to altitude increase, has driven the pin 102 from its FIG. 9 position to a new position in which the maximum allowable air speed pointer 42a, which moves with the pin 102, indicates a maximum allowable air speed of about 320 knots. The pointer 42a would also still indicate 0.84 Mach if it were visible through opening 98. The indicated air speed pointer 22a shows a speed of between 200 and 300 knots.

It can thus be seen that by virtue of the coaction of the pins 102 and 104, the indicator 10a operates like the indicator 10 to continuously indicate maximum allowable air speed in accordance with the limiting speed characteristic curve for the particular aircraft for which the indicator 10a is calibrated.

From the above description it is seen that this invention provides instruments 10 and 10a with fixed and movable air speed and Mach number dials 12, 12a and 16, 16a, respectively, indicated air speed pointers 22, 22a and maximum allowable air speed pointers 42, 42a which are easily read by aircraft pilots. The maximum allowable air speed pointers 42, 42a provide a continuous indication of maximum allowable air speed for a high altitude aircraft having particular limiting speed characteristics. The follower 66, cam 70, and adjustable linkage 72 can be varied and adjusted to provide for a VMO reading which will follow the curve portion 80 representing the particular aircraft to which the instrument 10 or 10a is to be applied. In other words, the follower 66, cam 70 and linkage 72, or an equivalent two-bar linkage of well known type, can be designed to obtain a desired movement of the maximum allowable air speed pointer in response to the rotation of rocking shaft 56.

It will be understood that the Mach and air speed indicator which is herein disclosed and described is presented for purposes of explanation and illustration and is not intended to indicate limits of the invention.

I claim:

1. In an air speed indicator which includes a fixed dial having air speed designations thereon, a concentric rotatable dial having Mach number designations thereon, an indicator pointer cooperating with said dials and means responsive to ambient pressure connected to said rotatable dial for rotating it relative to said fixed dial, the improvement comprising a maximum allowable air speed pointer member cooperating with said dials, means operatively connected to said pressure responsive means for rotating said maximum allowable air speed pointer relative to said dials at altitudes below a predetermined altitude, and means responsive to rotation of said rotatable dial and said maximum allowable air speed pointer to positions corresponding to the positions thereof at said predetermined altitude maintaining said rotatable dial and said maximum allowable air speed pointer in relatively fixed positions to effect rotation thereof as a unit during subsequent rotation of said rotatable dial in response to increases in altitude above said predetermined altitude.

2. An air speed indicator having the structure set forth in claim 1 wherein said last mentioned means comprises coacting force transmitting members secured to said rotatable dial and said maximum allowable air speed pointer and relatively positioned so that substantially at said predetermined altitude said force transmitting members engage.

3. An air speed indicator having the structure set forth in claim 1 wherein said last mentioned means comprises a force transmitting pin secured to said rotatable dial and relatively positioned thereon so that substantially at said predetermined altitude said force transmitting pin engages said maximum allowable air speed pointer.

4. An air speed indicator having the structure set forth in claim 1 wherein said pressure responsive means is operable to rotate said maximum allowable air speed pointer member relative to said dials in a direction to increase the air speed indicated thereby at altitudes below said predetermined altitude, and said pressure responsive means is operable to rotate said movable dial in an opposite direction in response to increases in altitude.

5. An air speed indicator having the structure set forth in claim 4 further including spring means urging said maximum allowable air speed pointer member in a direction to increase the reading thereof on said air speed dial, said spring means being of spiral shape such that it can be wound up on movement of said maximum allowable air speed pointer in the opposite direction by said rotatable dial.

6. An air speed indicator having the structure set forth in claim 1 wherein said means for rotating said rotatable dial includes a rocking shaft connected to said pressure responsive means for rotation thereby, an actuating shaft connected to said rotatable dial, and means connected to and extending between said shafts providing for rotation of said dial actuating shaft in response to rotation of said rocking shaft.

7. An air speed indicator having the structure set forth in claim 6 further including a maximum air speed pointer shaft secured to said pointer member and arranged in a concentric relation with said dial actuating shaft, and coacting means on said pointer shaft and said rocking shaft providing for a predetermined movement of said pointer member in response to a predetermined rotational movement of said rocking shaft.

8. An air speed indicator having the structure set forth in claim 7 further including spring means attached to said pointer shaft, said spring means urging said shaft in a direction opposite to the direction of movement of said movable dial in response to an increase in altitude.

9. An air speed indicator having the structure set forth in claim 7 further including shaft means secured to said indicating pointer, and pressure operated means responsive to air speed for rotating said indicating pointer relative to said air speed and Mach number dials.

10. An air speed indicator having the structure set forth in claim 9 wherein said rotatable dial actuating shaft is tubular in shape, said maximum allowable air speed pointer shaft is tubular and is concentric with said dial actuating shaft, and said indicating pointer shaft extends axially through said tubular shafts.

References Cited

UNITED STATES PATENTS

| | | | |
|---|---|---|---|
| 2,706,407 | 4/1955 | Hosford | 73—182 |
| 3,205,708 | 9/1965 | Andersen | 73—182 |

DONALD O. WOODIEL, Primary Examiner

116—129